United States Patent [19]

Maddens

[11] Patent Number: 5,003,582
[45] Date of Patent: Mar. 26, 1991

[54] METHOD OF ADJUSTING THE END OF TRANSMISSION IN A MODEM

[75] Inventor: Francis Maddens, La Colle Sur Loup, France

[73] Assignee: International Business Machines Corporation, Armonk, N.Y.

[21] Appl. No.: 468,313

[22] Filed: Jan. 22, 1990

[30] Foreign Application Priority Data

Feb. 28, 1989 [EP] European Pat. Off. ........ 89480026.7

[51] Int. Cl.⁵ ............................................. H04M 11/00
[52] U.S. Cl. ............................................ 379/98; 375/8
[58] Field of Search ................. 379/93, 94, 96, 97, 379/98; 375/121, 7, 8; 455/70

[56] References Cited

U.S. PATENT DOCUMENTS

| | | | |
|---|---|---|---|
| 3,783,194 | 1/1974 | Vilips et al. | 379/93 |
| 3,979,559 | 9/1976 | Roedel et al. | 379/97 |
| 4,009,356 | 2/1977 | Borysiewicz et al. | 379/97 |
| 4,317,207 | 2/1982 | Fujimura et al. | 375/121 |
| 4,669,090 | 5/1987 | Betts et al. | 455/70 |
| 4,833,696 | 5/1989 | Ichiyoshi | 375/121 |

Primary Examiner—Jin F. Ng
Assistant Examiner—Ahmad F. Martar
Attorney, Agent, or Firm—Edward H. Duffield

[57] ABSTRACT

The method of adjusting the end of transmission in a data transmission system between a transmitting Data Terminal Equipment (DTE) and a receiving DTE connected respectively by means of a transmitting modem and a receiving modem linked therebetween by a telephone line, consisting in transmitting by the transmitting modem an End sequence of predetermined duration immediately after the data message and just preceding the signal energy drop, and composed of bits of the same polarity. The transmission of the End sequence by the transmitting modem is started as soon as the data message from the transmitting DTE includes an uninterrupted sequence of bits of the same polarity, the End sequence being completed by modem with bits of the same polarity until the predetermined duration, after a request signal for transmitting from the transmitting DTE has turned off.

3 Claims, 2 Drawing Sheets

METHOD OF ADJUSTING THE END OF TRANSMISSION IN A MODEM

FIELD OF THE INVENTION

The present invention relates to the data transmission between two modems, and in particular to a method of adjusting the end of the data transmission from a transmitting modem to a receiving modem.

PRIOR ART

In system for transmitting and receiving data in the form of analog signals over telephone lines, the data are represented by modulation states of a carrier signal. The carrier signal is modulated at the transmitting end and demodulated by at the receiving end, the modulating-/demodulating assembly at each end being called a modem.

Some transmission systems operate in "continuous carrier" mode, i.e. the carrier signal is transmitted over the telephone line even when no data is transmitted.

But in some other transmission systems, such as multipoint communication systems, the terminals are requested to take turns in transmitting their data to the control system. Then, when a terminal ceases transmitting, it is necessary to interrupt the carrier as well in order to allow the control system to give another terminal the opportunity to transmit. Since it is difficult to detect the exact moment when transmission ceases, the system has to be provided with a device for detecting the end of transmission and allowing the time interval between the exact end of transmission and the detection of said end of transmission, to be reduced to a minimum. Such a device has been the subject of the European patent application 85 430024.1 filed by the applicant.

When a modem receives a data message to be transmitted to the Data Terminal Equipment (DTE) connected thereto, a carrier detector (CD) line is raised and enables the message to be sent to the DTE. As soon as the modem detects the end of transmission by a signal energy drop as explained in the above European patent application, the transmission is disabled between the modem and its DTE by turning off the carrier detector line. As the signal energy drop cannot be made very precisely, it is necessary that such a signal energy drop does not immediately follow the data message for preventing some data from being lost if the signal energy drop is detected too early. On the other hand, extra bits due to noise and disturbances on the telephone line could be decoded at the end of the data message, with a signal energy drop occuring some time after the end of message.

Accordingly, in order to preserve the message integrity and to avoid producing extra bits, an ending sequence generally composed of "1" bits is sent by the transmitting modem immediately after the end of the message provided by the DTE connected thereto when the request to send (RTS) signal from the DTE turns off. Such an ending sequence lasts a predetermined duration, such as 12 bauds, so that the turn off of the carrier detector provoked by the signal energy drop occurs during the reception of the ending sequence by the receiving modem.

In many applications or communication protocols, a sequence of "1" bits is already put by the DTE at the end of the data message as End of Transmission (EOT). But it is not a general rule and such EOT can last less than 2 bauds as well as more than 5 bauds.

Furthermore, in multipoint configuration, tributary modems can be tailed with another pair of modems linked by another telephone line. Again, the remote modem of the pair can be itself tailed with another pair of modems, and so on. In this case each receiving modem is used as a DTE for the modem which is tailed thereto, the signal CD of a receiving modem being used as RTS signal for the tailed modem. Therefore, as with the EOT, an ending sequence of the same predetermined duration (e.g. 12 bauds) is added by the tailed modem to the data message although there is already a "1" bit sequence ending the data message, which has been added by the first transmitting modem.

OBJECT OF THE INVENTION

Therefore, the object of the invention is a method of adjusting the end of data transmission between a transmitting modem and a receiving modem, wherein an ending sequence of repetitive identical groups of bits is added to the data message by the transmitting modem taking the uninterrupted sequence already present at the end of the message into account, whereby time is saved at each end of transmission.

BRIEF SUMMARY OF THE INVENTION

The method of the invention consists in transmitting an End sequence composed of bits of the same polarity, and having a predetermined duration, immediately after the data message and just before the signal energy drop; the transmission of this End sequence being started as soon as the data message received from the DTE includes an uninterrupted sequence of repetitive identical groups of bits, the End sequence including the uninterrupted sequence and being completed by the transmitting modem with said groups of bits until the end of the predetermined duration, after a request signal for transmitting from the transmitting modem has turned off.

The features and advantages of the invention will be more ascertained from the following description illustrated in the accompanying drawings wherein :

BRIEF DESCRIPTION OF THE DRAWINGS

As shown in FIG. 1, a signal "Request to Send" (RTS) is transmitted from a Data Terminal Equipment (DTE) to the associated modem when this DTE is ready to send data to a remote DTE over a telephone line. Upon receiving the RTS signal, the transmitting modem first transmits a training sequence (TS) followed by the data message. As soon as the message, from the DTE is completed, the RTS signal is turned off. At this time, according to the invention, the transmitting modem sends an ending sequence composed of "1" bits, the duration of which is function of the uninterrupted sequence of "1" bits that has been detected at the end of the data message. This sequence, EOT on FIG. 1, is composed of "1" bits which have been put at the end of the message by the DTE, but may also include other "1" bits representing true characters of data. As shown on FIG. 1, the total number of "1" bits resulting from the EOT sequence and the sending sequence added by the transmitting modems, has a duration of T. In the preferred embodiment, T has been chosen equal to 12 bauds but could be different insofar as the sequence lasts an optimum time preserving the message integrity and avoiding producing extra bits.

The receiving modem, after detection of the training sequence TS, raises carrier detector (CD) line which enables the data message to be sent to the DTE. As shown on FIG. 1, CD line falls back within the "1" bit sequence and thus avoids data bits from being lost and extra bits from being produced.

Figure 2:
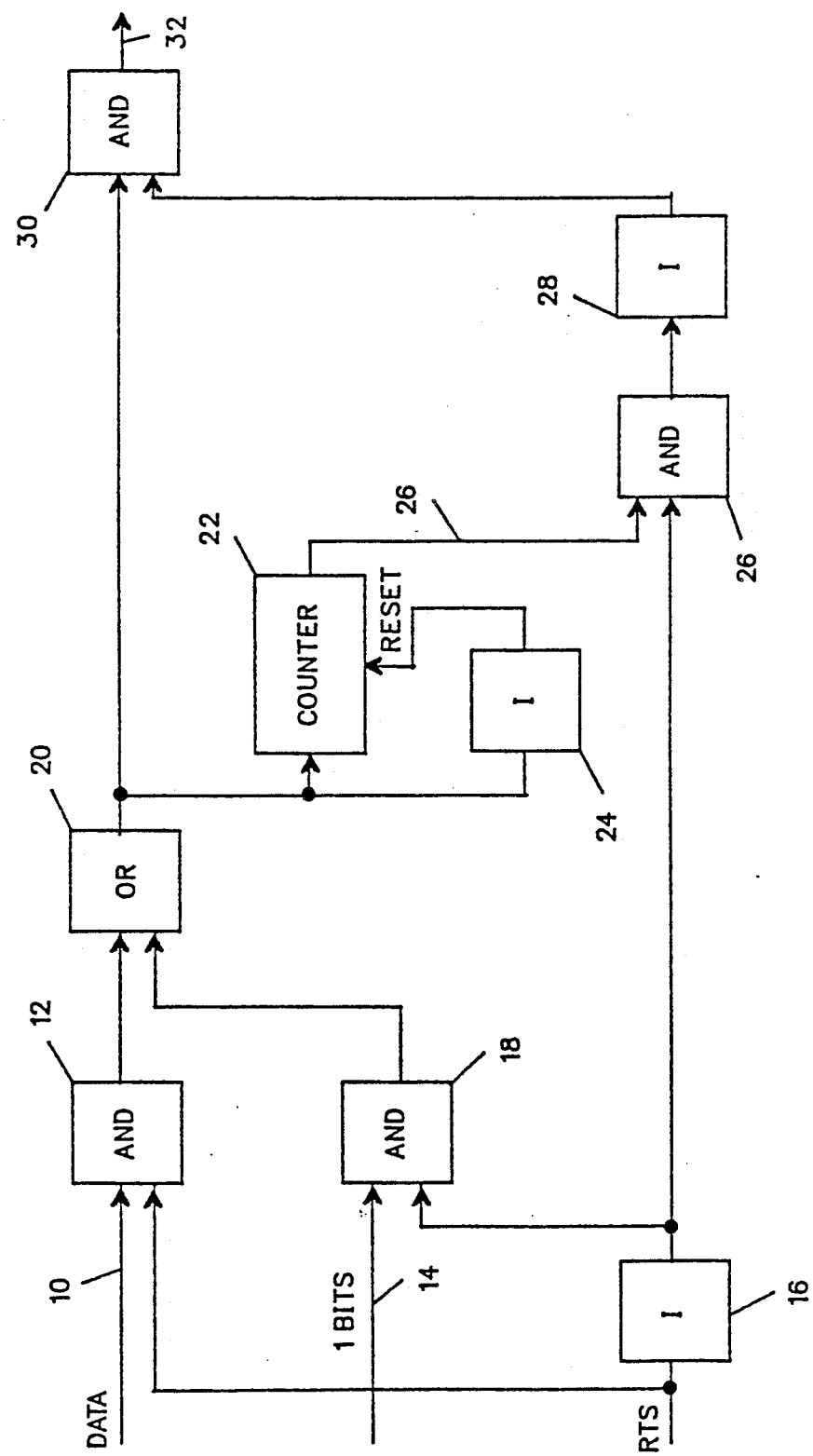
FIG. 2 is a block-diagram representing a logic embodiment of the invention.

A logic device used to implement the invention is shown on FIG. 2. A counter 22 is incremented by the "1" bits received from the output of OR circuit 20. These "1" bits come either from the data line 10 as long as AND circuit 12 is enabled by RTS signal, or from line 14 when RTS falls back by means of inverter circuit 16 and AND circuit 18. As long as RTS line is on, a counter 22 is incremented by an uninterrupted sequence of "1" bits, and reset by inverter circuit 24 receiving a "0" bit from the output of OR circuit 20, interrupting the "1" bit data sequence, from the DTE. As already mentioned, the "1" bit sequence received before RTS line falls back, can be due to either data exclusively composed of "1" bits or a sequence of "1" bits added at the end of the data message from the DTE. The sequence of "1" bits is transmitted, by means of AND circuit 30 enabled by Inverter circuit 28 the output of which is high as long as counter 22 has not reached the value corresponding to the predetermined duration T, over line 32 for being modulated.

As soon as counter 22 reaches the value corresponding to a sequence of "1" bits of the predetermined duration T, a pulse is produced at its output 26. As a pulse is also present at the output of Inverter circuit 16 due to RTS line being of, AND circuit 26 is enabled. Therefore, Inverter circuit 28 provides a "0" pulse as output, disabling AND circuit 30 and stopping the transmission of the End sequence of "1" bits on line 32.

In multipoint configuration, tributary modems can be tailed with another pair of modems linked by another telephone line. Again the remote modem of the pair can be itself tailed with another pair of modems, and so on. Each receiving modem is used as a DTE for the modem which is tailed thereto, the signal CD of a receiving modem being used as signals RTS for the tailed modem. In this case, the End sequence transmitted by a tailed transmitting modem is composed of an eventual uninterrupted sequence of "1" bits, at the end of the data message from the transmitting DTE, the part of the ending sequences added by the preceding transmitting modems before the end of their respectible enable signal CD and the ending sequence of "1" bits added by the last transmitting modem until the end of the predetermined duration.

Figure 1:
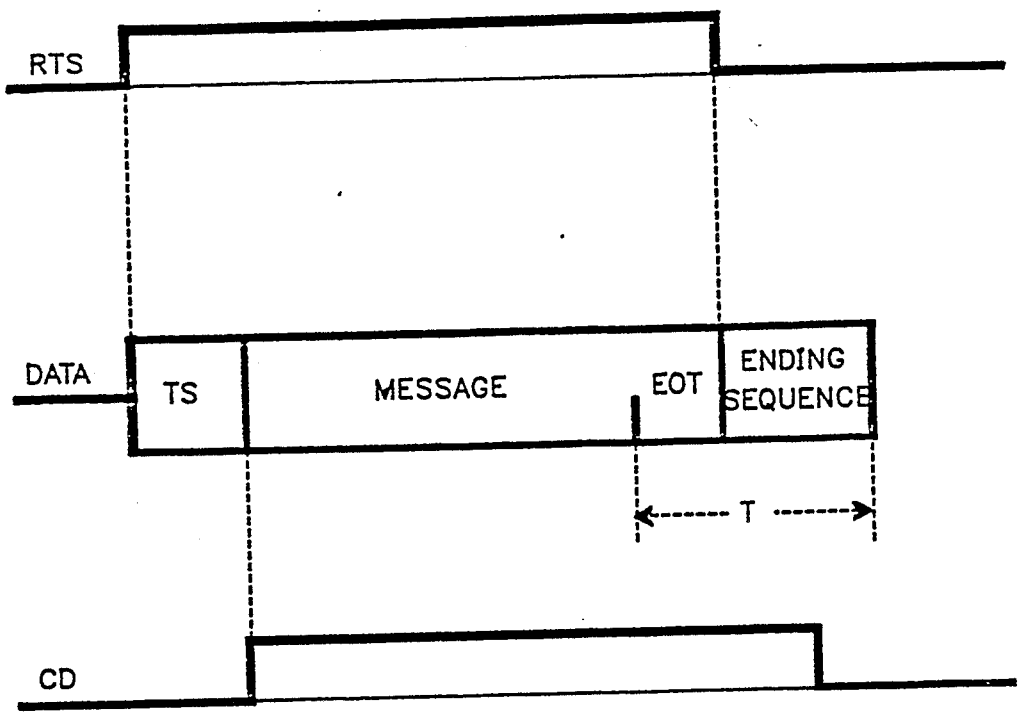
FIG. 1 is a timing schema showing how the ending sequence is located with respect to the signals exchanged between the DTE and its connected modem.

Though the embodiment described hereabove in reference to FIGS. 1 and 2, relates to a End sequence composed of "1" bits, it would be possible to conceive that such a sequence be composed of "0" bits or of repetitive identical groups of bits, such as 0101 ... or 00110011 ..., without modifying the spirit of the invention.

For the sake of illustration, the invention has been described as being implemented by a hardwired logic device. But, it is within the skill of the man of the art utilizing the teachings of the present description to understand that the invention can be entirely software implemented in the signal processor of the modem.

I claim:

1. A method of adjusting the end of data transmission to prevent loss of data and thereby saving retransmission time in a transmission system existing between a transmitting Data Terminal Equipment (DTE) and a Receiving DTE connected, respectively, by means of a transmitting modem and a receiving modem linked together by a telephone line, said method comprising steps of:
    transmitting a data message said transmitting DTE to said transmitting modem for coding and transmission of said data message over said telephone line by said transmitting modem, said data message being ended by said DTE by an uninterrupted End of Transmission (EOT) sequence composed of bits having the same polarity and having a variable total sequence time duration at the transmitting speed of said modem;
    adding and transmitting by said transmitting modem to said uninterrupted EOT sequence an ending sequence composed of bits of said same polarity so as to form with said uninterrupted EOT sequence an end sequence composed of bits having the same polarity and of a predetermined total sequence time duration;
    raising a Carrier Detector (CD) line by said receiving modem upon detecting said data message, said CD line raising enabling said data message to be forwarded to said receiving DTE; and
    dropping said CD line by said receiving modem upon detecting a signal energy drop corresponding to the termination of said end sequence received at said receiving modem, said CD line drop disabling data transmission by said receiving modem to said receiving DTE, said disabling occurring within said end sequence and thereby preventing true data from being lost.

2. A method as described in claim 1 wherein:
    said receiving DTE is comprised of a tailed transmitting modem directly connected to said receiving modem, said tailed transmitting modem being linked with a tailed receiving modem over a telephone line, and wherein:
    said CD line is used, when raised, as a request signal (RTS) line for said tailed transmitting modem and
    said end sequence transmitted by said tailed transmitting modem is composed of said uninterrupted EOT sequence of bits of same polarity, an ending sequence added by said transmitting modem and received by said receiving modem before the dropping of said CD line, and a complimentary ending sequence of bits of said same polarity added by said tailed transmitting modem.

3. A method as described in claim 1 or claim 2, wherein:
    said end sequence is composed of 1" bits.

* * * * *